March 15, 1938. J. H. P. MAGNÉ 2,111,102
FERMENTATION APPARATUS
Filed Jan. 22, 1934 3 Sheets-Sheet 1

Inventor:
Jean H. P. Magné,

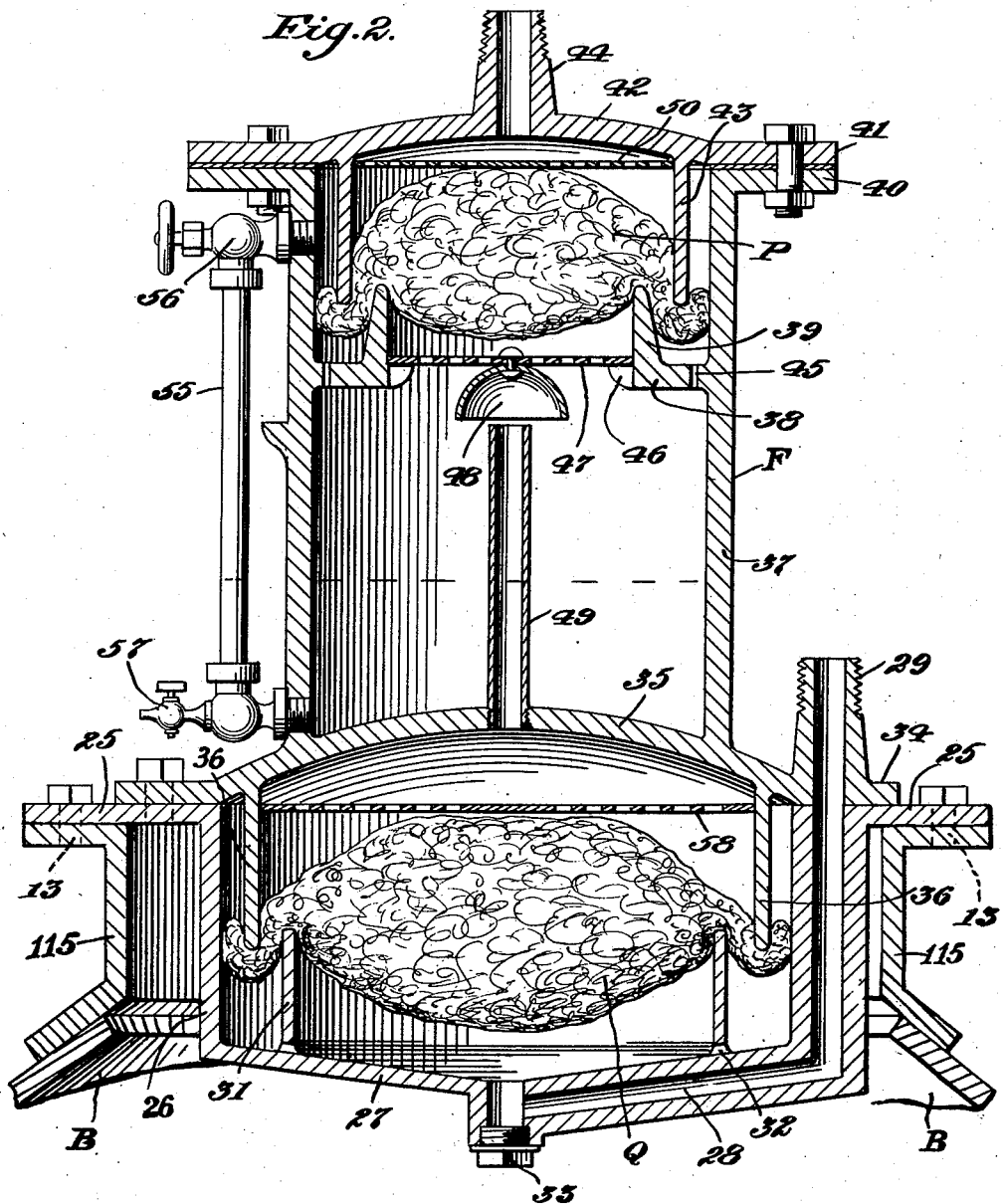

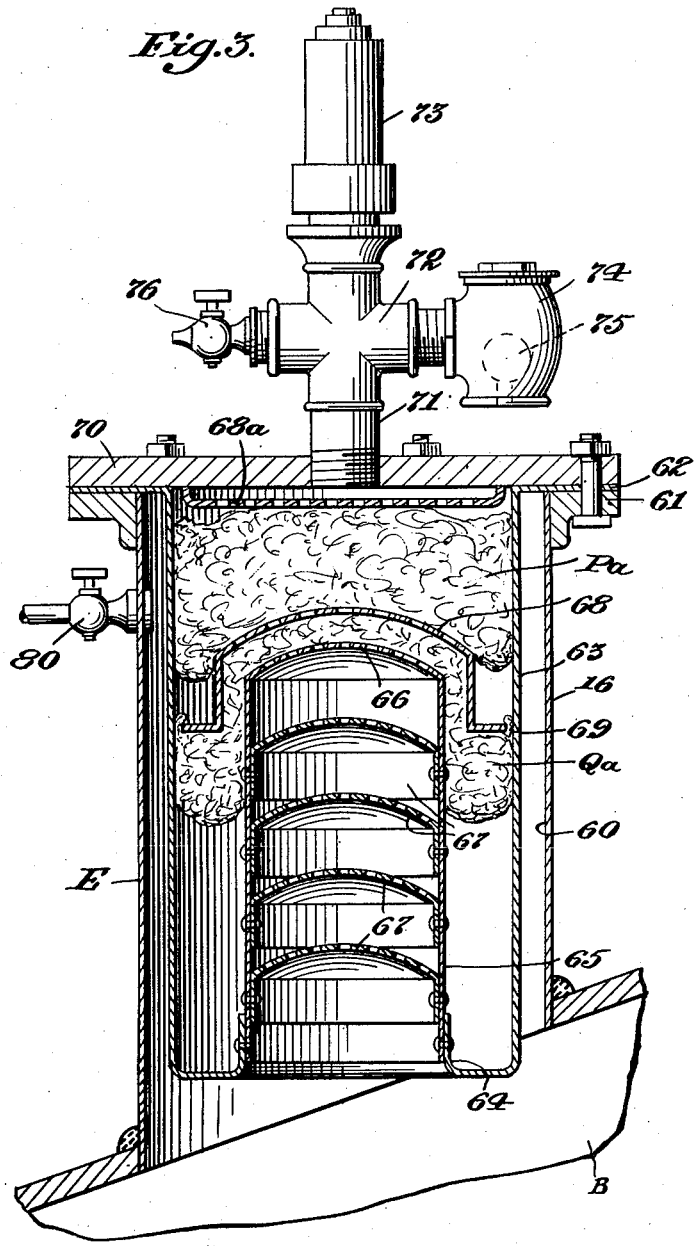

Patented Mar. 15, 1938

2,111,102

UNITED STATES PATENT OFFICE 2,111,102

FERMENTATION APPARATUS

Jean Henri Pascal Magné, Leucate Plage, Aude, France, assignor to American Biochemical Products Co., Inc., Baton Rouge, La., a corporation of Louisiana Application January 22, 1934, Serial No. 707,813

6 Claims. (Cl. 195—141)

This invention relates to improvements in fermentation apparatus which are especially adapted for employment with the pure culture apparatus described in my United States Letters Patent No. 1,212,656, granted January 16, 1917.

One of the features of the present invention is the provision of means for controlling the pressure existing within the fermentation apparatus through intermediation of filter devices which permit inspection and replacement of the filter means employed for separating the bacteriological impurities from gas entering the apparatus, without establishing a possible contact of bacteriologically impure gas with the contents of the fermentation apparatus during such replacement.

Another feature of the present invention is the provision of means for permitting the escape of excessive pressure and of admitting gas in the event of sub-atmospheric pressure within the fermentation vessel, with the employment of filter means and devices whereby the filter is regularly subjected to a sterilization during the operation of the apparatus, and means are provided to prevent contact of solid or liquid materials contained in the fermentation vessel with the filter means.

A further feature of the present invention is the provision of filter supports which permit the employment of pads or wads of cotton batting as the filter means, comprising structures for supporting the pads in such manner that the pad may be of varying thickness while still maintaining a bacteriological filter seal.

Still another feature of the present invention is the provision of means for admitting gas under pressure to the filtering vessel, with the inclusion of duplicate filter members between which is provided a trap for separating liquids, so that the first or outer filter member separates the bacteriological impurities from the entering gas, while the trap completes the removal of separable liquids therefrom; the second or inner filter member being provided to protect against the entry of bacteriologically impure gas during the inspection and/or removal of the outer filter member.

With these and other objects in view as will appear in the course of the following specification and claims, an illustrative example of practicing the invention is set forth on the accompanying drawings, in which the devices are shown as applied to a pure culture apparatus of the type shown in my aforesaid patent.

In the drawings:

Figure 2 is a vertical and diametrical sectional view, on a larger scale, of the means for removing impurities from gas being admitted under pressure to the vessels of Figure 1.

Figure 3 is a corresponding view of a structure provided for controlling the pressure within the vessel, with the associated filter elements.

Figure 1:
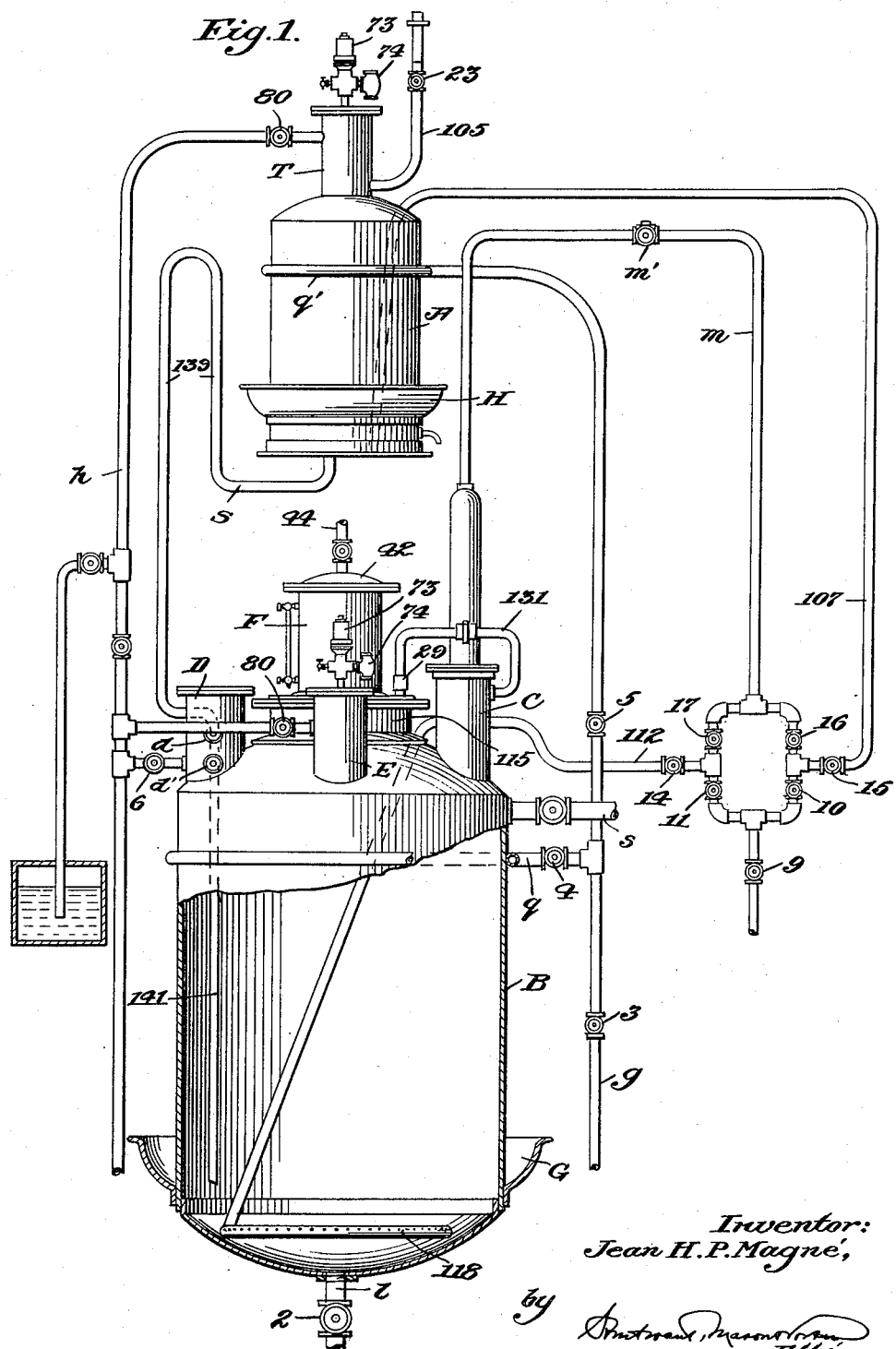
Figure 1 is a view of essential parts of a pure culture apparatus, having the present invention applied thereto, parts being shown in section.

In the drawings, a pure culture apparatus is shown of the type illustrated in my aforesaid patent; and like reference characters are employed for many of the common features. This apparatus is operated by seeding the sterilized contents of a large chamber with a pure culture which has been preserved from a prior operation in a secondary seeding chamber. During the cultivation period, a quantity of seed is withdrawn from the large vessel to the seeding chamber and the remaining contents of the main vessel are continued in propagation and/or are withdrawn for seeding a beer vat, for example, or for other uses. During the course of the operation, it is desirable to provide a maximum limit to the pressure which may exist in the vessels and to prevent this pressure dropping substantially below atmospheric. Also, it is desirable to employ steam and gas (usually air) under pressure for the sterilization, aeration, and/or agitation of the contents of the fermentation vessels, and for expelling the contents therefrom.

As shown in Figure 1, a main vessel B, of substantially closed type, is provided internally with a perforated bottom pipe ring 118 for the admission of sterilizing steam and of agitation air; a bottom discharge conduit 1 with a control valve 2, a top flange 115 closed by a filtering structure F described in detail hereinafter; a secondary filter head C; a connection head D; and a pressure control head E likewise described in detail hereinafter.

Above this main vessel B is illustrated a seeding vessel A provided with a pressure control head T substantially identical with the pressure control head E, and connected by a siphon S having portions extending upwardly above a predetermined liquid level in vessel A to provide a liquid seal 139 and extended downwardly and through the connection head D and within the main vessel B as a conduit 141 to communicate with the main vessel adjacent the bottom thereof being controlled by the duplicate valves d, d' having stems extending externally of the head D.

A conduit g for cooling water is controlled by a main valve 3 and has branch conduits q and q' terminating in perforated annular pipes around the vessels B and A and controlled by individual valves 4, 5 so that a down-flowing sheet of water may be provided externally on the jacket walls of the vessels B and A, being collected by gutters G and H thereof and thence discharged in any desired manner.

The structure F, for purifying the gas forced into the vessels, comprises a lower member having a flange 25 resting upon and secured in sealing relationship to flange 115 by bolts 13. This flange 25 is integral with a downwardly extending skirt wall 26 and a closing bottom wall 27. An air delivery conduit 28 is provided in the walls 27 and 26 and leads to a connection 29 and thus to the conduit 131. Spaced from the skirt wall 26 is provided a supporting partition flange 31 within the lower member, this partition having apertures 32 so that drainage of liquid may occur from the annular space outside it to the space within it. The liquid collected in this inner space is in minor quantity and is collectible for a considerable period of time within the member and may be removed therefrom when the member is separated from the vessel B by removing the closing plug 33 if desired.

An intermediate member includes a flange 34 which rests upon and is secured to the flange 25 of the lower portion; a bottom closing wall 35 which shuts off an inner filter chamber in conjunction with walls 26 and 27 and has a downwardly extending partition annular flange 36 of larger diameter than the supporting partition 31; an upwardly extending wall 37 providing a liquid trap chamber; an intermediate inwardly extending annular partition flange 38 having an upwardly extending supporting flange 39 thereon spaced from wall 37; the connection 29; and an upper attaching flange 40.

An upper or cover member is provided with a flange 41 sealed and secured to the flange 40 to close the structure; a top closing wall 42 having a downwardly extending partition member 43 of larger diameter than the supporting member 39; and an air connection 44 to a source of air under pressure.

The flange 36 provides an annular chamber which is in communication with the filter chamber by small orifices 45 which permit the drainage of liquid therethrough. This annular flange includes supporting means 46 for a perforated plate or screen 47 having a deflection bell 48 secured thereto and located above the open upper end of the vertical eduction tube 49 supported by and sealed to the closure wall 35.

A deflection plate 50 is located within the annular partition 43 and may be frictionally supported thereby. It has an imperforate central portion opposite the orifice of the air connection 44, and is perforated adjacent its periphery for the downward passage of air therethrough. The spaces above and below the flange 38 are normally in communication with one another through a gauge glass 55 which gives an external indication of the liquid level existing in the trap chamber. The upper end of the gauge glass may be shut off from communication with the space inside the wall 37 by a valve 56, while its lower end is preferably provided with a petcock 57 by which liquid may be relieved from the trap chamber. Within the annular partition 36 is provided a deflection plate 58 similar to the deflection plate 50 in having an imperforate center opposite the orifice of eduction tube 49, and having perforations at its periphery. The plates 50 and 58 serve to distribute the air and prevent the direct impact of entering air at the center of the corresponding filter member, and thus an overloading and obstruction of this portion of the corresponding filter member.

A first or outer filter member P is composed of a cotton pad or wadding which may be of any suitable thickness, and preferably of larger diameter than the wall 37. It may be inserted by simply pressing it within the wall 37, allowing its edges to extend upwardly along the wall. The upper member is then placed in position, with its partition 43, so that this partition presses the periphery of the filter pad downwardly and tends to compress the edge against the wall 37, and also to compress the pad between the lower edge of partition 43 and the upper edge of the supporting flange partition 39, thus accomplishing a tight double seal and an adequate securing of the pad in place, while at the same time compensating for variations in thickness of the pad and supporting the pad free of the inlet and outlet orifices.

The lower filter member Q is similarly positioned, being held between the wall 26, the upper partition 36, and the lower flange partition 31.

The conduit system 28 and 131 extends to the secondary filter C (as shown in the aforesaid patent) and thence by pipe $m$ through the check valve $m'$ to the air control valves 16 and 17 and through pipes 107 and 112 to the bottoms of the vessels A and B, under control of the valves 15 and 14, preferably entering these vessels through perforated pipe rings 118. This conduit system, with check valve $m'$, prevents steam or free solid or liquid material from the main vessel 10 moving backward through the filter system, and thus the inner filter Q remains dry and free from contamination upon which bacteria might grow, for a long period of time. The air entering through connection 44 is distributed over the primary or outer filter member P and its bacteriological impurities are separated therein, along with any dew or other liquid already condensed, and the air then passes the perforated plate 47 into the trap chamber, in which it deposits any later separated liquid, and then moves through the eduction tube 49 and past the inner filter member Q and thus through the conduit system 28 and 30 to the vessels A and B in a condition free from bacteriological impurities, and substantially free from liquid. Any excess of moisture collected by the outer filter P passes downward into the trap chamber, above bottom plate 35 and accumulates there, being prevented by the bell 48 from dripping into the eduction pipe 49.

At any time, even during actual culture in the main vessel B, it is possible to inspect the outer filter P by removing the cover 42, or to withdraw liquid from the trap chamber 37 by opening petcock 57, preferably after closing petcock 56. The removal of the cover 42 does not permit air to enter the trap chamber 37 under normal conditions. If the outer filter P is found charged with impurities such as bacteria, or moisture, etc., it may be easily removed and replaced by a fresh, clean and dry wadding and the cover replaced. While the outer filter P is removed, the inner filter Q prevents the movement of impurities into the main vessel B. Since this inner filter is of secondary nature only, it does not become charged with dirt or bacteriological matter to any great degree. It may, however, be replaced by removing the intermediate member upon separating its flange 34; this operation preferably occurring immediately following a withdrawal of seed into the seeding vessel 20 and immediately prior to the sterilizing operation of the main chamber 10. It will be noted that the walls 26 and 27 are exposed to the temperature conditions prevailing in the vessel 10, so that the use of steam for sterilizing this vessel and/or its contents will produce a sterilizing temperature in the inner filter chamber, resulting in the sterilization of the contents thereof; this sterilization occurring regularly with the sterilization of each new substrate batch introduced into the main vessel 10, and without the reflux of steam therethrough.

The pressure control structure E of Figure 3 is likewise arranged for inspection and removal of an outer filter member while an inner filter member preserves the integrity of the bacteriological seal. To this end, the outer wall member 60 has an upper flange 61 secured thereto to support an upper flange 62 in secured and sealed relationship thereto. This upper flange 62 is preferably integral with a skirt wall 63 spaced from the wall 60 and having an inwardly and upwardly turned lower flange structure 64 which is connected in sealed relation to the imperforate skirt wall 65 of a foam breaker having a perforated upper wall 66 and being provided with a plurality of perforated partitions 67 at spaced intervals therein.

An inner filter member Qa is illustrated as of cotton batting and of larger diameter than the skirt wall 63, being forced down over the perforated end 66 and extending into engagement with the wall 63, being slightly compressed upon the wall 66 by a perforated plate 68 having an outwardly extending pressure flange 69. The outer filter member Pa rests upon the plate 68 and is prevented thereby from blending with the inner filter member Qa so that this outer filter member may be easily removed and replaced without a disengagement or movement of the inner filter member Qa which might destroy the bacteriological seal effected by it. The outer filter member Pa is likewise of cotton batting, and likewise is of larger diameter than the skirt wall 63 so that it may be forced into place and thus establish a tight seal within the skirt wall 63a. A perforated dish member 68a is employed to hold the outer filter member Pa away from the orifice of the conduit 71 and to distribute entering air over the filter member Pa.

It will be noted from Figure 1 that the pressure control head E extends above the upper wall of the closed vessel B, the annular space between walls 60 and 63 thereof being in continuous communication with the space within the closed vessel B and having a valved connection 80 to the discharge conduit h.

The pressure control head T of the seeding vessel A may be of the same design as pressure control head E, but ordinarily is smaller in size by reason of the lesser volume of this seeding vessel.

In operation, the entire system is sterilized by the passage of steam through valves 9, 10, 11, 14 and 15, with escape past the opened valves 80 and 6. After closing the steam valves 14 and 10, water is then admitted from conduit g to the ring pipes q, q', and the vessel reduced to the desired temperature. A seed culture is then introduced through conduit 105 past valve 23 in the manner described in the aforesaid patent, into the seeding vessel A, in which preferably has been introduced a desired quantity of substrate medium. The apparatus is now ready for use.

The main vessel B is filled to the desired level with a culture substrate through the valved conduit s, the valve 80 of the main vessel being opened to permit the free escape of air from the main vessel B. It will be noted that no yeast is then present in the main vessel. Steam is then admitted again by opening valve 14 so that it passes from the pipe ring 118 through the contents of the main vessel B and sterilizes the same.

This steam escapes upwardly through the spaces in heads D and E and through the open valves 6 and 80 and thus to the discharge conduit h. The pressure at this time is relatively low and the safety valve 73, check valve 74 and petcock 76 are closed so that there is no substantial movement of steam or air from the vessel B to and through the X-connection 72; filters Qa and Pa are thus substantially free of duty at this time, but the presence of steam in the space between walls 60 and 63 definitely sterilizes the filters each time sterilization of vessel B is accomp'ished. A lowering of temperature in the vessel B causes a sterilization of filtering means in the air admission head F. These sterilizations of the filter means occur automatically in the normal course of such preliminary sterilization of the contents of the main vessel B. There is no flow of steam backwardly through the air supply conduits m, 131, etc., by reason of the action of the check valve m'.

Valve 4 is opened again and the contents of the vessel B reduced to the desired temperature. During this cooling, any drop of pressure below atmospheric in vessel B is satisfied by air entering through the check valve 74 of the pressure control head.

Valves 16, d, d' are now opened and sterilized air under pressure is admitted through conduit 107 to the seeding vessel A, and the contents of this vessel are expelled through the siphon S and its conduit 141 into the main vessel B. The propagation begins and usually the pressure is permitted to increase, ordinarily assisted by the discharge of air through valve 14, conduit 112 and pipe ring 118 in the event of propagation of aerobic bacteria, etc. When the pressure reaches a predetermined amount, valves d, d' may be opened again and a seeding portion for a subsequent operation is then forced upwardly through conduit 141 and siphon S back into the seeding vessel A. Valves d, d' are closed again and the propagation in the main vessel B may be continued to the desired extent. If desired, likewise, it is possible to sterilize the seed vessel A while empty by maintaining the valves d, d' closed, opening the valve 80, and opening the steam connection past valves 9, 10 and 15 through conduit 107; this being followed by a cooling from the pipe ring q' if necessary.

Any foaming or bubbling occurring in the main vessel B during sterilization or during propagation therein does not lead to the projection of solid or liquid material upon the filter members, owing to the operation of the aforesaid conduits and foam breaker.

Any increase of pressure above a point established by the valve 73 is relieved by the passage of gas from the vessel B through the foam breaker (which removes solids and liquid therefrom), through the filters Qa and Pa in succession, to connection 72 and out through the safety relief valve 73. At any time that the pressure within the vessel B falls below atmospheric, air may enter through the check valve 74 with purification by the outer and inner filters Pa and Qa and thus passed downward into the main vessel B. The outer filter Pa may be inspected as desired, and replaced without any movement of the inner filter Qa, this inner filter then serving for removing contamination matters from the entering air. The inner filter Qa may be replaced at the same time as the inner filter Q of the structure shown in Figure 2, and then is sterilized automatically during the following sterilization of the substrate introduced into vessel B.

It is obvious that the invention is not limited solely to the illustrative construction shown, but that it may be employed in many ways within the scope of the appended claims.

Having thus described the invention, what I claim as new and desire to secure by Letters Patent is:

1. In a pure-culture apparatus, a closed culture vessel and a conduit communicating therewith, walls providing a jacket surrounding a portion of said conduit, one end of the annular jacket space being in communication with the interior of the vessel, means for delivering gas into said conduit, a filter member located within the said portion of the conduit for obstructing the passage of bacteriological impurities through the conduit, means located in the conduit between said filter member and the interior of the vessel for preventing the passage of solid and liquid matter from the vessel to said filter member, means for admitting steam into the vessel for sterilizing the same, and a sealable outlet from the other end of the jacket space whereby steam employed in said vessel for sterilization therein may be passed through said space for sterilizing said filter member.

2. In a pure-culture apparatus, a closed culture vessel enclosing walls providing a filter chamber mounted on said vessel and in heat-exchange relation with the contents of said vessel, conduit means for passing gas through said filter chamber and into said vessel, said conduit means including a removable member, a first filter member in said conduit and accessible for removal and replacement when said removable member is removed, a second filter member located in said chamber and thereby in a portion of the conduit between said first filter member and the vessel, a first liquid trap included in said conduit between said filter member, and a second liquid trap included in said conduit between second filter member and the vessel.

3. In a pure-culture apparatus, a closed culture vessel, means for heating the vessel to a sterilizing temperature, means attached to said vessel and providing a chamber means adjacent the vessel so that the chamber means is heated during sterilization of the vessel and including a removable cover for the chamber means, a gas-supply conduit connected to said cover for delivering a gas into the chamber means, a first filter member and means for supporting the same in said chamber means for compelling gas at the top of the chamber means to pass through said first filter member in its way along said chamber, a second filter member and means for supporting the same in said chamber means downstreamward of said first filter member and adjacent the hottest portion of the chamber so that said second filter member is sterilized when the vessel is sterilized, and conduit means from the chamber means downstreamward of the second filter member and communicating with the interior of the culture vessel.

4. In a pure-culture apparatus, a closed culture vessel, means for heating the vessel to a sterilizing temperature, means attached to said vessel and providing a chamber means adjacent the vessel so that the chamber means is heated during sterilization of the vessel and including a removable cover for the chamber means, a gas-supply conduit connected to said cover for delivering a gas into the chamber means, a first filter member and means for supporting the same in said chamber means for compelling gas at the top of the chamber means to pass through said first filter member in its way along said chamber, a second filter member and means for supporting the same in said chamber means downstreamward of said first filter member and adjacent the hottest portion of the chamber so that said second filter member is sterilized when the vessel is sterilized, conduit means from the chamber means downstreamward of the second filter member and communicating with the interior of the culture vessel, and a device in said conduit means for preventing passage of solid and liquid matter from the vessel to said second filter member.

5. In a pure-culture apparatus, a closed culture vessel and a gas-supply conduit establishing communication between a gas inlet and said vessel, said conduit including a first annular vertical outer wall and an annular upwardly directed first flange located within and spaced from said walls, an apertured removable member providing a part of said conduit and having a second flange larger than said first flange and smaller than said wall, a first flexible bacteriological filter pad supported on said first flange and having its peripheral portion held compressed by said second flange in sealing relation against said first flange and said first wall when the removable member is positioned in sealing relation with said first wall, whereby said filter pad operates to prevent passage of infectious matter, a bottom closing wall for said first wall and forming therewith a liquid trap below said first filter pad, a second flexible bacteriological filter pad, and means in said conduit downstreamward of the filter trap for supporting said second filter pad.

6. In a pure-culture apparatus, a closed culture vessel having a recess at its top, means for heating said culture vessel to a sterilizing temperature whereby the contents of said recess are also sterilized, means for closing said recess comprising a partition connected to the vessel and having an annular vertical wall extending therefrom, said partition and wall providing a liquid trap above the recess, an annular upwardly directed first flange located within and spaced from said vertical wall, an apertured removable member for sealing the upper end of said vertical wall and having a second flange larger than said first flange and smaller than said wall, a first flexible bacteriological filter pad supported on said first flange and having its peripheral portion held compressed by said second flange in sealing relation against said first flange and said wall, a second flexible bacteriological filter pad, and means for supporting the same in said recess, a gas inlet communicating with said cover member, first conduit means for establishing communication between the upper portion of the liquid trap and said recess, and second means for establishing communication between the lower part of said recess and said culture vessel.

JEAN HENRI PASCAL MAGNÉ.